US012179863B2

(12) United States Patent
Sawada

(10) Patent No.: US 12,179,863 B2
(45) Date of Patent: Dec. 31, 2024

(54) MODULE ATTACHMENT METHOD

(71) Applicant: Nissan Motor Co., Ltd., Yokohama (JP)

(72) Inventor: Yasuhiro Sawada, Kanagawa (JP)

(73) Assignee: Nissan Motor Co., Ltd., Yokohama (JP)

(*) Notice: Subject to any disclaimer, the term of this patent is extended or adjusted under 35 U.S.C. 154(b) by 0 days.

(21) Appl. No.: 18/293,802

(22) PCT Filed: Aug. 5, 2021

(86) PCT No.: PCT/JP2021/029192
§ 371 (c)(1),
(2) Date: Jan. 31, 2024

(87) PCT Pub. No.: WO2023/012986
PCT Pub. Date: Feb. 9, 2023

(65) Prior Publication Data
US 2024/0246625 A1 Jul. 25, 2024

(51) Int. Cl.
*B62D 65/02* (2006.01)
(52) U.S. Cl.
CPC ................. *B62D 65/024* (2013.01)
(58) Field of Classification Search
CPC .................................................. B62D 65/024
See application file for complete search history.

(56) References Cited

U.S. PATENT DOCUMENTS 7,788,782 B2 * 9/2010 Shimoda ............... B62D 65/10
703/1
2012/0148377 A1 * 6/2012 Suzumura ............ B62D 65/024
414/222.01

FOREIGN PATENT DOCUMENTS

JP 2011-11692 A 1/2011
JP 5302797 B2 10/2013

* cited by examiner

*Primary Examiner* — Rick K Chang
(74) *Attorney, Agent, or Firm* — Global IP Counselors, LLP

(57) ABSTRACT

An attachment method basically includes detecting a vehicle body side error; a detecting a module side error; correcting the position of a module in the X, Y and Z directions and the angles W, P, and R with respect to each axis based on the vehicle body side and the module side errors; detecting a vehicle body center Bc by measuring both the left and right sides of a vehicle body using the vehicle body side error; detecting a module center by measuring both the left and right sides of the module using the vehicle body side error; and correcting the position of the module based on the vehicle body center and the module center to realize sufficient accuracy by correcting position errors of the vehicle body and the module even in a case in which a positional error exist.

5 Claims, 6 Drawing Sheets

MODULE ATTACHMENT METHOD

CROSS-REFERENCE TO RELATED APPLICATIONS

This application is a U.S. national stage application of International Application No. PCT/JP2021/029192, filed on Aug. 5, 2021.

BACKGROUND

Technical Field

The present invention relates to a method for attaching modules such as instrument panels to a vehicle body that has been transported to a prescribed position on a vehicle production line.

Background Information

A conventional module attachment method is described in, for example, Japanese Patent No. 5302797 (hereinafter Patent Document 1). The method for attaching modules described in Patent Document 1 is a method for mounting an instrument panel in a vehicle cabin. The above-mentioned attachment method measures the positions of a pair of left and right side vehicle body measurement reference sections in the vehicle width direction at symmetrical positions in the vehicle, and also measures the positions of a pair of left and right instrument panel side measurement reference sections in the vehicle width direction at symmetrical positions in instrument panel before it is brought into the vehicle cabin.

The attachment method then calculates the center difference between the center position in the vehicle width direction in plan view obtained by each of the measurements and the position in the vehicle width direction in plan view of the instrument panel, and based on the center difference, the instrument panel is assembled on fixed to the vehicle body after the vehicle width direction position of the instrument panel brought into the cabin is adjusted.

SUMMARY

However, the module attachment method of the prior art does not take into consideration position errors of a vehicle stopped at a prescribed position or position errors of an instrument panel grasped by an industrial robot. Therefore, the module attachment method of the prior art has the problem that it is difficult to obtain sufficient centering accuracy when, for example, a vehicle is stopped in a prescribed position or an instrument panel grasped by the industrial robot is tilted.

The present invention was devised in response to the problems of the prior art and is intended to provide a module attachment method that can correct position errors and obtain sufficient centering accuracy even when there is a position error of a vehicle body stopped at a prescribed position or of a module grasped by an industrial robot.

In the module attachment method of the present invention, when a module grasped by an industrial robot is attached to a vehicle body stopped at a prescribed position, with the front-rear direction of the vehicle body as the X direction, the left-right direction as the Y direction, and the up-down direction as the Z direction, the vehicle body and the module have vehicle body side joints and module side joints, respectively, on the left and right sides of each, which face each other in the X direction.

The attachment method comprises a first step of measuring the positions of the left and right vehicle body side joints in the X, Y and Z directions and the angles with respect to the X, Y and Z axes relative to the vehicle body, and detecting vehicle body side error (correction value) which is the difference between the measured values and a reference position of the vehicle body; a second step of measuring the positions of the left and right module side joints in the X, Y and Z directions and the angles with respect to the X, Y and Z axes relative to the module held by an industrial robot, and detecting the module side error (correction value), which is the difference between the measured values and the reference position of the module; and a third step of moving the module into the vehicle body, so that the vehicle body side joint and the module side joint are facing each other while the position of the module in the X, Y and Z directions and the angles with respect to the X, Y and Z axes are corrected (compensated) based on the vehicle body side error and the module side error.

The attachment method also features a fourth step, wherein, after the third step, the vehicle body center in the Y direction of the vehicle body is detected by measuring the positions of the left and right sides of the vehicle body in the Y direction using the vehicle body side error; a fifth step, wherein, after the third step, the module center in the Y direction of the module is detected by measuring the positions of the left and right sides of the module in the Y direction using the vehicle body side error; and a sixth step of correcting the position of the module, so that the module center detected in the fifth step matches the vehicle body center detected in the fourth step. In addition, the measured values of the angles with respect to the X, Y and Z axes include the values calculated using the positions in the X, Y and Z directions.

By the above-described configuration, the module attachment method of the present invention can correct position errors and obtain sufficient centering accuracy, even when there is a position error in the vehicle body stopped at a prescribed position or in a module grasped by an industrial robot.

BRIEF DESCRIPTION OF THE DRAWINGS

Referring now to the attached drawings which form a part of this original disclosure.

DETAILED DESCRIPTION OF EMBODIMENTS

First Embodiment

FIGS. 1 to 6 illustrate an embodiment of a module attachment method of the present invention. The module attachment method is a method in which a module M, which is held by an industrial robot, is attached to a vehicle body B that is stopped at a prescribed position in a vehicle production line. This embodiment illustrates a case in which a cockpit module M (hereinafter referred to simply as "module"), including an instrument panel, etc., is mounted in vehicle body B.

In the module attachment method of the present invention, the front-rear direction of vehicle body B is the X direction, the left-right direction is the Y direction, the up-down direction is the Z direction, and the angles with respect to the X, Y and Z axes are W, P, and R, respectively. Further, the vehicle body B and the module M have vehicle body side joints Ba and Ba, and module side joints Ma and Ma, at mutually symmetrical positions in the X direction.

The module attachment method of the present invention uses a first industrial robot R1 for grasping the module M, and second and third industrial robots R2 and R3, located on the left and right sides of vehicle body B. The first industrial robot R1 has a clamping mechanism in its hand for grasping and releasing the module M. The second and third industrial robots R2 and R3 have various sensors and tools, such as bolt runners, described below, in their hands. Industrial robots R1 to R3 are each known multi-axis control-type robot with a hand controllable in the X, Y and Z directions and with respect to each axis (angles W, P, and R).

Figure 1:
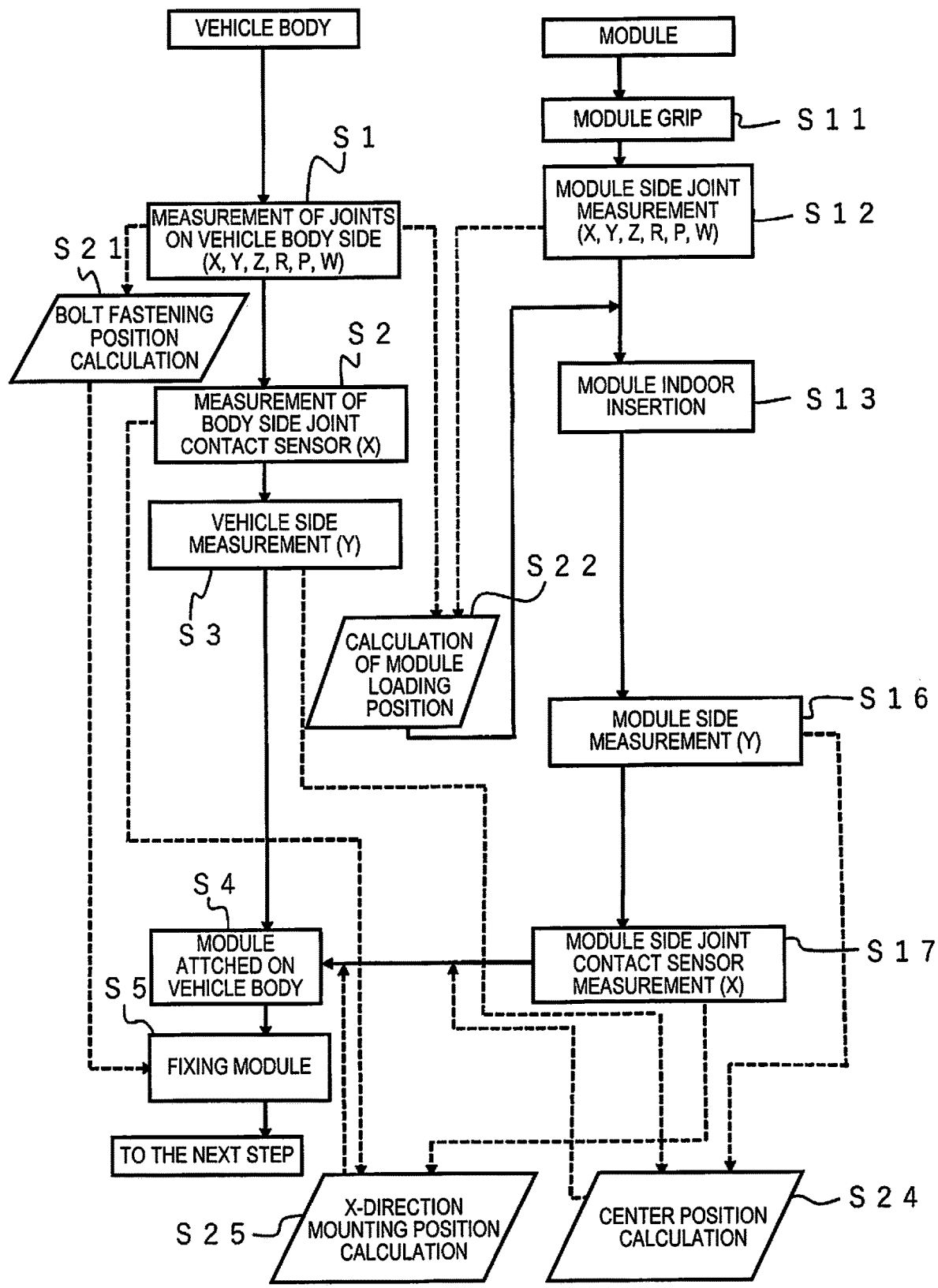
FIG. 1 is a flowchart describing a first embodiment of the module attachment method of the present invention.

As shown in FIG. 1, the attachment method includes a first Step S1 in which the positions of the left and right vehicle body side joints Ba in the X, Y and Z directions and the angles W, P and R with respect to the X, Y and Z axes relative to vehicle body B are measured, and the body side error (correction value), which is the difference between the measured values and the reference position of vehicle body B, is detected. Here, the reference position of vehicle body B is measured in advance using a master model of vehicle body B. Note that "first" in "first step" is merely a number that distinguishes that step from other steps and does not indicate step sequence. The same applies to all such numbers in the following description.

Figure 2:
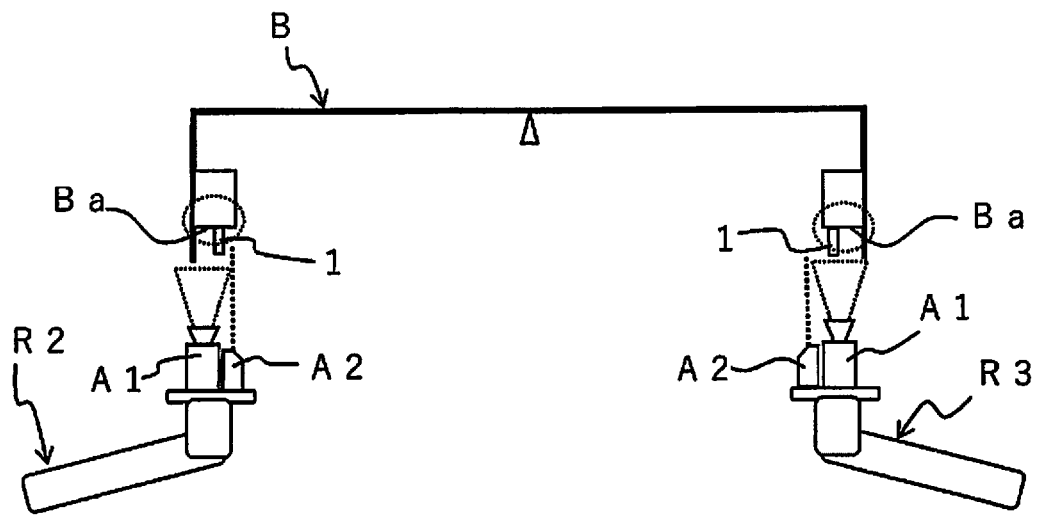
FIG. 2 is a plan view showing the measurement of a vehicle body side joint.

In the first Step S1, as shown in FIG. 2, the second and third industrial robots, R2 and R3, are disposed on the left and right sides of the vehicle body B, and non-contact type distance measurement sensors are attached to the robot hands. Each distance measurement sensor is a combined two-dimensional image sensor (camera) A1 and a laser distance sensor A2. The two-dimensional image sensor A1 can detect the position of a vehicle body side joint Ba in the Y and Z directions primarily from an image thereof. The distance sensor A2 can detect the position of a vehicle body side joint Ma in the X direction primarily from measurements thereof.

Since the distance measurement sensors are disposed on the left and right sides of the vehicle body B together with industrial robots R2 and R3, the angles W, P, and R with respect to each axis of vehicle body side joint Ba can be calculated from the data from both. Body side joint Ba has a locating pin 1 that projects toward the rear of the vehicle body. Once the body side error is detected in the first Step S1, the fastening position of bolt 3 is calculated in Step S21 shown in FIG. 1.

Next, in Step S11 of the attachment method shown in FIG. 1, the module M is grasped. In a second Step S12 of the attachment method, the positions of left and right module side joints Ma in the X, Y and Z directions and the angles W, P, and R with respect to each axis are measured, and the module side error (correction value), which is the difference between the measured values and the reference position of the module M, is detected. Here, the reference position of the module M is measured in advance using the master model of module M.

Figure 3:
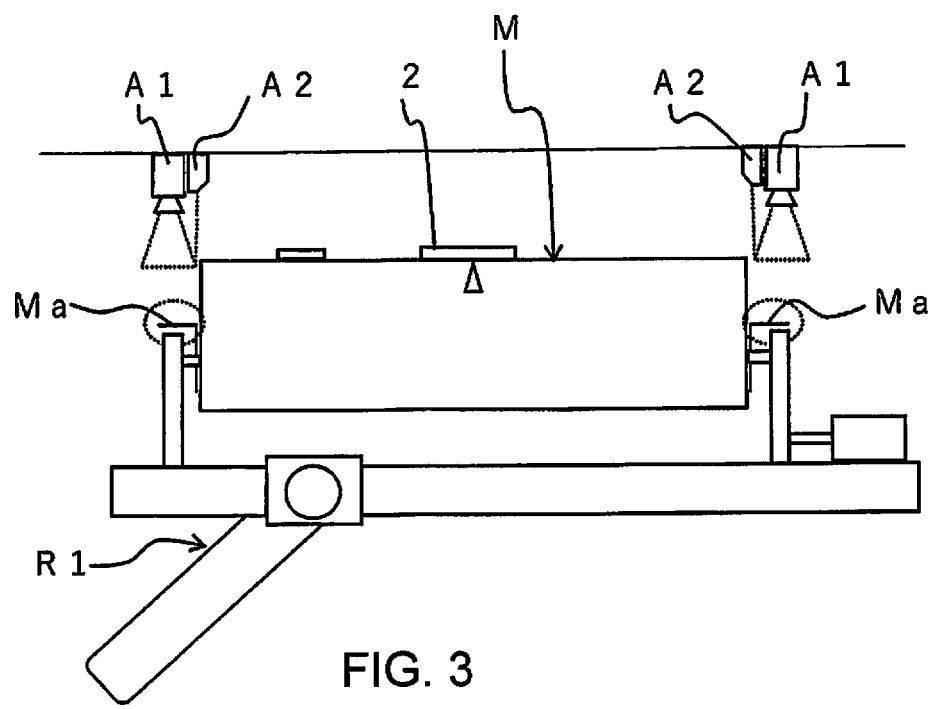
FIG. 3 is a plan view showing the measurement of a module side joint.

In the second Step S12, as shown in FIG. 3, a non-contact type distance measurement sensor is used on the module M held by the industrial robot R1 and placed at fixed sites opposite module side joints Ma. The distance measurement sensor is a combined two-dimensional image sensor A1 and a distance sensor A2, like those installed on the second and third industrial robots, R2 and R3, and can detect the position of module side joints Ma in the X, Y and Z directions and calculate angles W, P and R with respect to each axis from this data. Note that module side joints Ma in the example shown are flanges opposite vehicle body side joint Ba and has an insertion hole (not shown) for the locating pin 1.

Next, in a third Step S22 of the attachment method, after the module M is moved into the vehicle body B in Step S13 shown in FIG. 1, the vehicle body side joints Ba and the module side joints Ma are made to oppose each other, and the X, Y and Z positions and the angles W, P, R of the module with respect to each axis are corrected based on the vehicle body side error and the module side error. In this third Step S22, the module attachment position is calculated using the correction values for the body side error and the module side error, and the calculation result is used as an operating instruction for first industrial robot R1.

The attachment method described above also uses a contact sensor A3 that makes contact with the left and/or right body side joints Ba in vehicle body B from the X direction, and before the module M is centered with respect to the vehicle body B, the positions of vehicle body side joints Ba in the X direction are detected by the contact sensor A3, and the positions of the module side joints Ma of the module M moved into the vehicle body B are detected by the contact sensor A3. In the present embodiment, the positions in the X direction of vehicle body side joints Ba are detected by the contact sensor A3 in Step S2 shown in FIG. 1, and the positions in the X direction of the module side joints Ma are subsequently detected by the contact sensor A3 in Step S17 shown in FIG. 1.

In the attachment method described above, as shown in FIG. 4, the contact sensor A3 is attached to the hand of the second industrial robot R2. The measurement by the contact sensor A3 can be performed by using the second and third industrial robots R2 and R3 to measure the left and right vehicle body side joints Ba and Ba; however, since first industrial robot R1 holds the module M in a cantilevered state, all that is needed is to measure vehicle body side joint Ba, which is stable and closer to the hand.

Next, in a fourth Step S3 of the attachment method, a centering step, a vehicle body center Bc in the Y direction of vehicle body B is detected by measuring the Y-direction positions of both the left and right sides of the body B and using the body side error obtained in the first Step S1 after the third Step S22. The centering step also includes a fifth Step S16 to detect a module center Mc of the module M in the Y direction by measuring the positions of both the left and right sides of the module M in the Y direction and using the vehicle body side error obtained in the first Step S1 after the third Step S22. Further, the centering step includes a sixth Step S24 to correct the position of the module M, so that module center Mc detected in the fifth Step S16 matches the vehicle body center Bc detected in the fourth Step S3.

Figure 4:
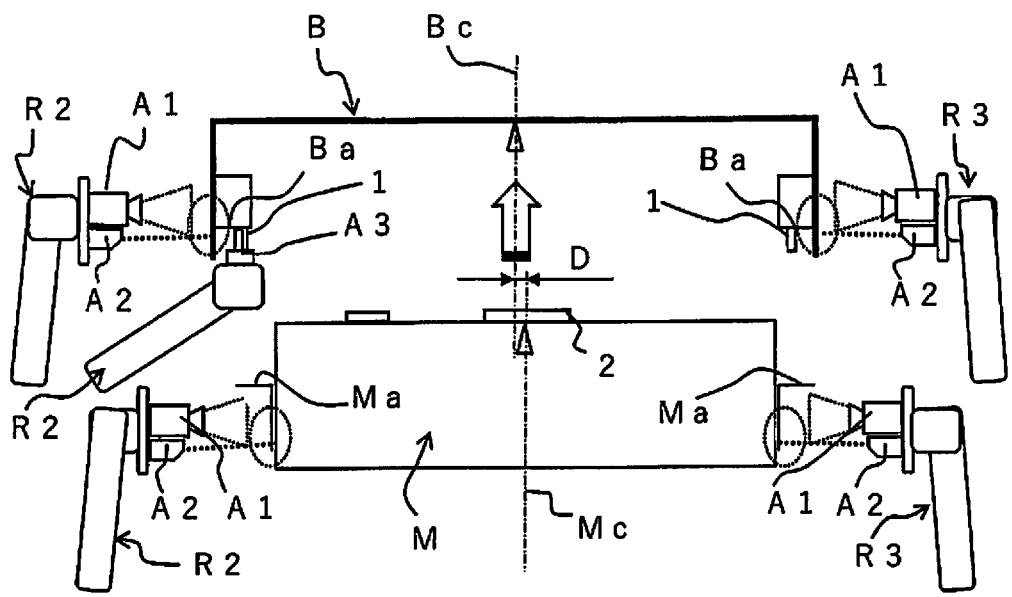
FIG. 4 is a plan view of the measurement of the left and right sides of a vehicle body and module.

In the fourth Step S3, as shown in FIG. 4, the second and third industrial robots R2 and R3 and the distance sensors (A1, A2) attached to their hands are used to measure both the left and right sides of the vehicle body B. In this case, the position of the vehicle body B includes the error on the vehicle body side measured in the first Step S1. Therefore, in the fourth Step S3, the vehicle body center Bc is detected using the vehicle body side error, which is the correction value.

Further, in the fifth Step S16, as shown in FIG. 4, the same distance sensors (A1, A2) are used to measure both the left and right sides of the vehicle body B. In doing so, the position of the module M is corrected in the third Step S22; however, it has been corrected with respect to the vehicle body B including the vehicle body side error. Therefore, in the fifth Step S16, the module center Mc is detected using the vehicle body side error, which is the same correction value as in the fourth Step S3.

It should be noted that although the measurement sites on the vehicle body B and the module M, are not particularly limited, it is desirable that such sites be easily recognizable, such an uneven surfaces or holes in symmetrical positions; by using locating holes formed on the vehicle body or the module M, it is possible to perform accurate measurements without being affected by peripheral equipment.

Figure 5:
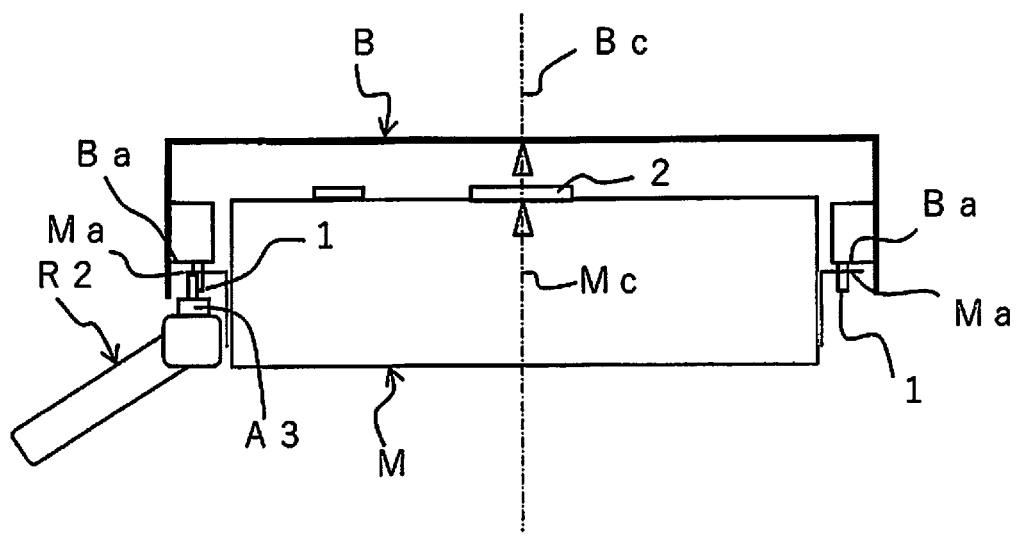
FIG. 5 is a plan view showing the measurement of a module side joint by a contact-type sensor.

In the sixth Step S24, as shown in FIG. 4, the difference D between the vehicle body center Bc and the module center Mc measured in the fourth Step S3 and the fifth Step S16 is calculated, and an operating instruction is output to first industrial robot R1, so that the difference D is eliminated, that is, as shown in FIG. 5, the module center Mc is coincident with the vehicle body center Bc.

In the attachment method described above, in contrast to the X-direction position detection of the vehicle body side joint Ba in the previous Step S2, in Step S17 shown in FIG. 1, the contact sensor A3 is used to detect the X-direction position of the module side joint Ma of the module M that was moved into vehicle body B. Then, in Step S25, the distance in the X direction from the position of the vehicle body side joint Ba to the module side joint Ma (attachment position in the X direction) is calculated, and an operating instruction is output to first industrial robot R1.

Thus, in Steps S4 and S5 shown in FIG. 1, the attachment and securing of module M onto the vehicle body B is completed. More specifically, in the above-described attachment method, when the centering of the module M is completed as shown in FIG. 5, the module M, which has been placed in vehicle body B, has moved forward into a position in which the vehicle body side joint Ba and the module side joint Ma are separated by a prescribed distance.

Therefore, in the attachment method described above, the distance from the previously measured (Step S2) position of the vehicle body side joint Ba to the X-direction position of module side joint Ma is calculated (Step S25) by measuring the X-direction position of the module side joint Ma with the contact sensor A3 (Step S17), as shown in FIG. 5.

In the attachment method described above, as shown in FIG. 6, the module M is then advanced in the X direction by the calculated distance. This forward movement is performed by the first industrial robot R1, which grasps the module M.

Figure 6:
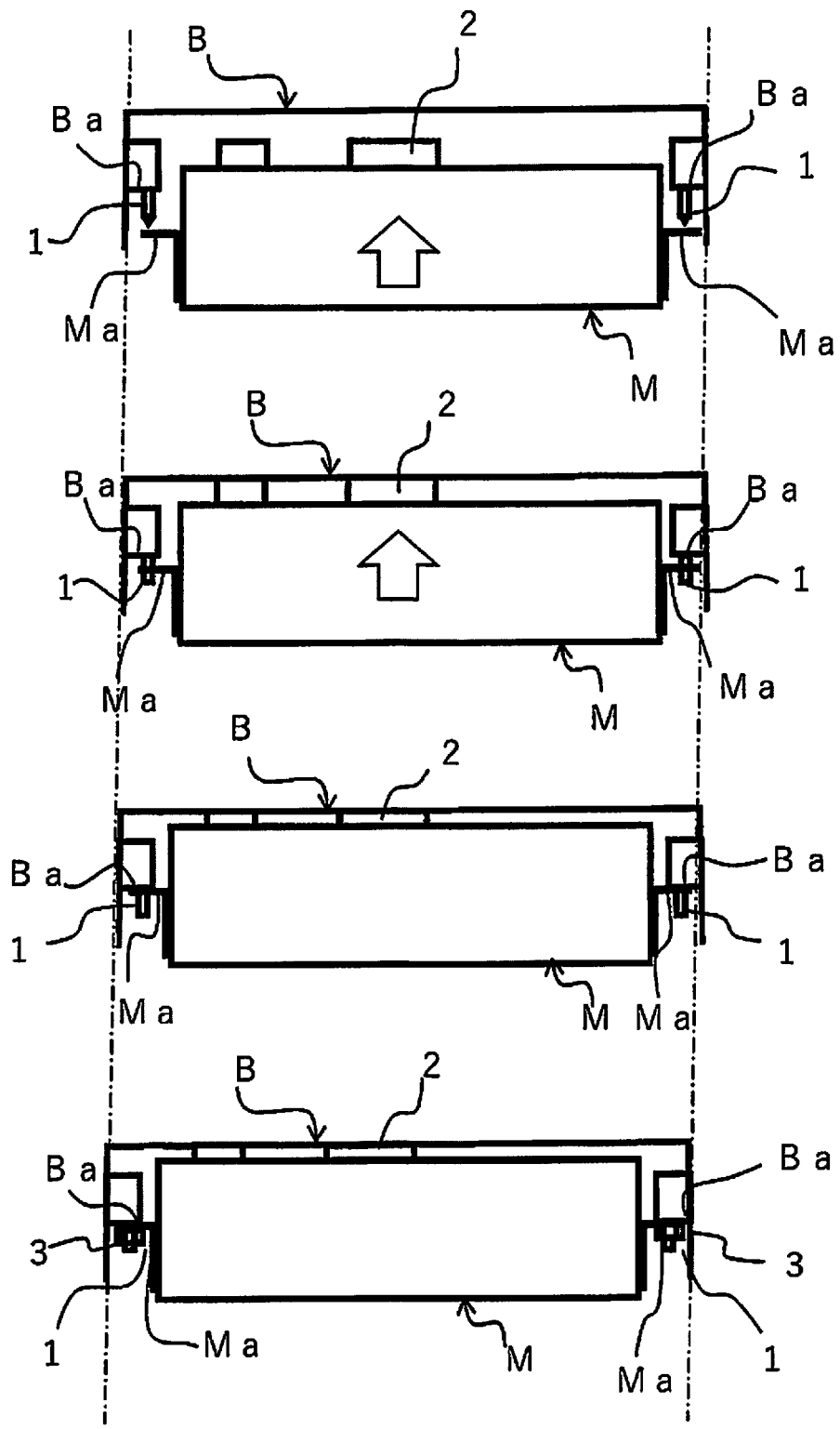
FIG. 6 is a plan view showing the final steps of a step-by-step module attachment process.

In the present embodiment of the attachment method, when the module M is advanced, as shown in the first (topmost) row of FIG. 6, the sealing component 2 that is fixed to the module M comes in contact with the vehicle body B, as shown in the second row of FIG. 6. Then, as shown in the third row of FIG. 6, at the point when the module side joint Ma aligns with the vehicle body side joint Ba without contact, the sealing component 2 is compressed and the module M stops moving forward. Thus, the module side joint Ma comes in contact with the vehicle body side joint Ba, and the locating pin 1 of the vehicle body side joint Ba passes through the insertion hole (not shown) of the module-side joint Ma.

In the attachment method, the securing of the module M is then completed by screwing the bolt 3 through the module side joint Ma to vehicle body side joint Ba, as shown in the fourth (bottom) step of FIG. 6 (Step S5). The bolt 3 is screwed in using a bolt runner attached to the hand of the second industrial robot R2. The vehicle body B is then transported to the next step.

The module attachment method described in the foregoing embodiment, by the first Step S1, second Step S12, third Step S22, fourth Step S3, fifth Step S16, and sixth Step S24, provides highly accurate measurements irrespective of variations in the error and permits sufficient centering accuracy by compensating for position errors, despite initial position error in the vehicle body B stopped at a prescribed position or in the module M grasped by the industrial robot R1.

In other words, in the attachment method described above, the positioning accuracy for the module M with respect to the vehicle body B can be ensured to a certain extent by the first Step S1 through the third Step S22; but thereafter, in the fourth Step S3 and the fifth Step S16, by detecting the vehicle body center Bc and module center Mc using the same vehicle body side error (correction value), then moving to the sixth Step S24, more accurate centering is achieved by eliminating the influence of robot arm deflection, etc.

Here, in vehicle body B, door trim is placed on the left and right sides of the above-mentioned module (cockpit module) M. Even if the module M were to be attached by manually, it would be difficult to achieve uniformity in the height or the distance (gap) between the module M and the door trim on both sides. In contrast, the above-described module attachment method provides high centering accuracy, so that automatic assembly can make the gap between the module M and each door trim on the left and right sides uniform without unevenness, which contributes to improved vehicle quality.

Further, the above-described attachment method enables highly accurate measurements since the control accuracy of the industrial robots, R2 and R3, and the measurement accuracy of the distance sensors (A1 and A2) are measured under the same environment and conditions for the vehicle body B and the module M; also, highly accurate centering can always be performed without being affected by slight residual error variations.

Further, the above-described attachment method uses a combined two-dimensional image sensor A1 and a distance sensor A2 as a pair of left and right distance measurement sensors, enabling measurement (calculation) of positions in the X, Y and Z directions and the angles W, P, and R with respect to each axis, so that it is possible to easily support mixed production in which a plurality of vehicle models are manufactured on a single production line.

Further, the above-described attachment method uses the contact sensor A3 that makes contact with the left and/or right body side joints Ba of the vehicle body B from the X direction, and the same contact sensor A3 detects the X direction position of body side joint Ba and the X direction position of the module side joint Ma of the vehicle body B. Thus, the attachment method allows accurate positioning and joining of both joints Ba and Ma without applying unnecessary external force to the vehicle body side joint Ba or the module side joint Ma during final assembly.

Second Embodiment

Figure 7:
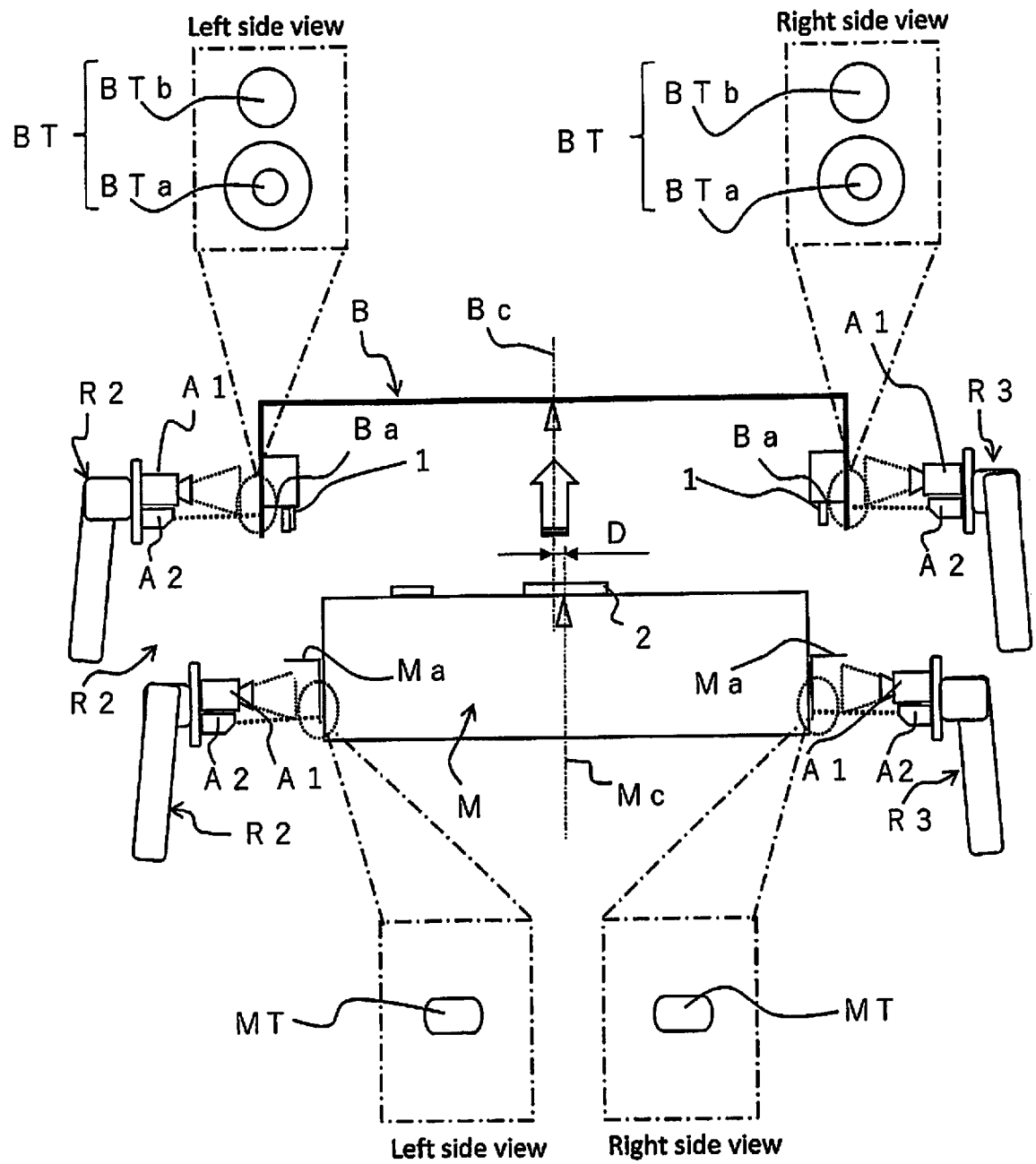
FIG. 7 is an illustration showing the measurement of the side of the vehicle body and module in the second embodiment of the module attachment method of the present invention.
Figure 8:
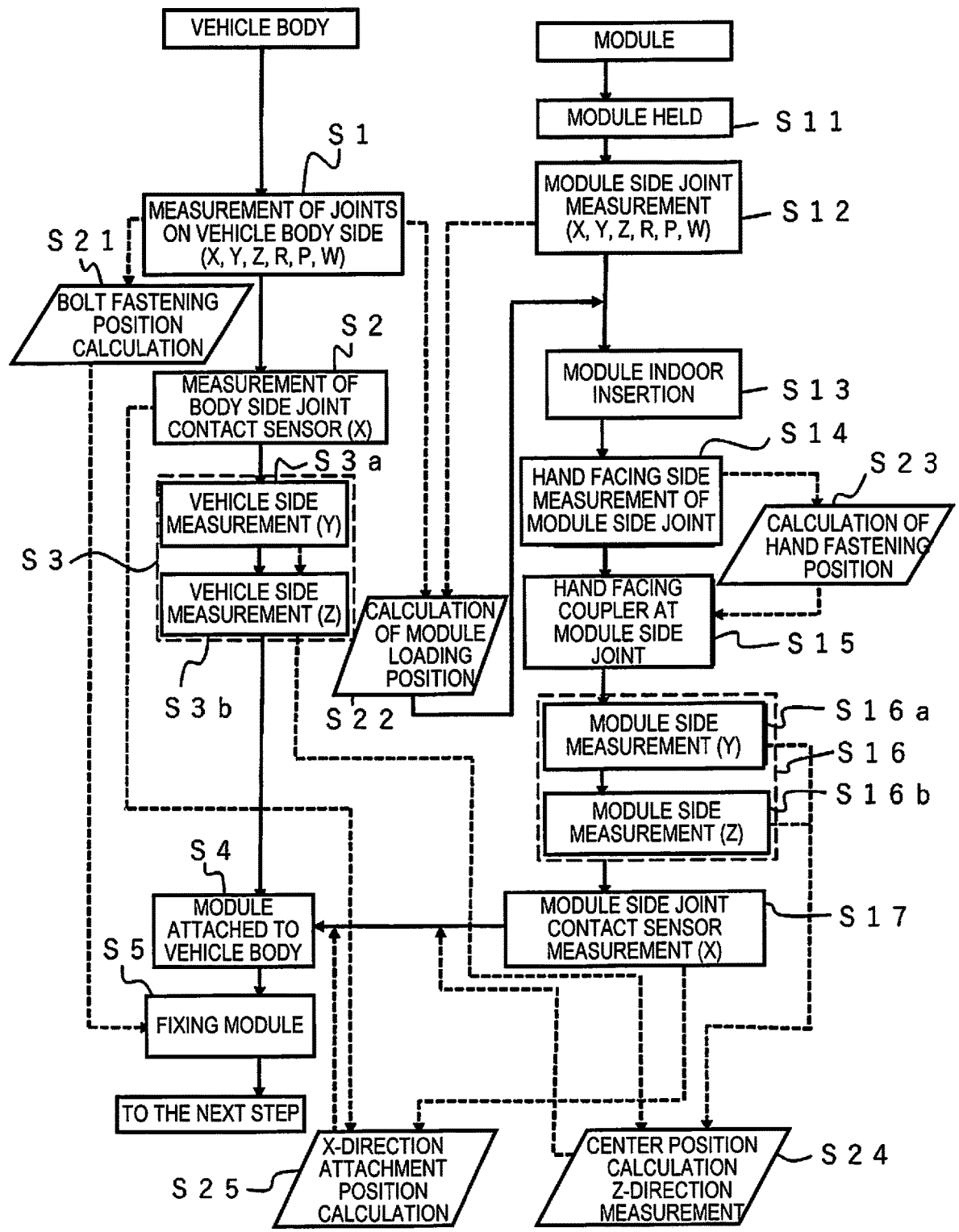
FIG. 8 is a flowchart illustrating a second embodiment.

FIGS. 7 and 8 are diagrams illustrating a second embodiment of the module attachment method of the present invention. Note that in the second embodiment, elements identical to those in the first embodiment have been assigned the same reference numerals, and their detailed explanations have been omitted.

As shown in FIG. 7, the module attachment method of the present embodiment has the same basic configuration as that of the first embodiment and, at the time of attachment, aligns a target site BT on the vehicle body side and a target site MT on the module side on the left and right sides of the vehicle body B and the module, respectively. The target site BT on the vehicle body side in this embodiment is an attachment hole BTa provided on the door attachment surface of the door side panel and a flat area BTb in the vicinity thereof. The target site MT on the module side, on the other hand, is a trim attachment hole located where the module meets the door trim.

In the present embodiment of the attachment method, the first industrial robot R1 holds module M in a cantilevered state. Thus, in the above-described attachment method, in Step S14 shown in FIG. 1, the module side joint Ma on the side facing the hand is measured; in Step S23, the hand connection position is calculated; and in Step S15, another industrial robot, not shown, grasps the module M to support the first industrial robot R1. This eliminates the effects of the bending, etc., of the arm that constitutes the first industrial robot R1 and achieves a more accurate attachment. Note that if the module M is held stably, Steps S14, S23, and S15 can be omitted.

As shown in FIG. 8, in Step S3a of the fourth Step S3 of the above-described attachment method, the vehicle body center Bc in the Y direction of the vehicle body is detected; and, in the next Step S3b, the position (height) of the vehicle body side target site BT in the Z direction is measured. In Step S16a of the fifth Step S16 of the attachment method, the module center Mc of the module M in the Y direction is detected; and in the next Step S16b, the position (height) of the module side target site BT in the Z direction is measured.

In the above-described attachment method, a distance sensor A2 of the distance measurement sensor is used to measure the position of the flat portion BTb of the vehicle body side target site BT and the position of the module side target site BT. Further, particularly for the vehicle body B, following confirmation of the positions of the attachment hole BTa and the flat portion BTb of the vehicle body side target site BT can be determined using two-dimensional image sensor A1, the position of the flat portion BTb can again be determined using distance sensor A2 to improve measurement accuracy.

In the sixth Step S24, the above-mentioned attachment method is determined by calculating the vehicle body center Bc and the module center Mc, and an operating instruction is output to the first industrial robot R1 so that the module center Mc is aligned with the vehicle body center Be, and the left-right position of the module is corrected. On the other hand, in the sixth Step S24, the Z direction position (height) of vehicle body side target site BT and the module side target site MT are calculated, and an operating instruction is output to the first industrial robot R1 to align module side target site MT with the vehicle body side target site BT, and the vertical position of the module is corrected. At this time, in the above-described attachment method, in order to achieve more precise alignment in the Z direction, the measurement value of the contact sensor A3, which the measurement was found in Step S2, is input to the third Step S22.

As in the first embodiment, the second embodiment of the module attachment method can correct position error and attain sufficient centering accuracy even if there is an initial position error in the vehicle body B stopped at a prescribed position or in the module M grasped by the industrial robot R1.

In addition to the first embodiment, in the fourth Step S3 of the above-described attachment method, the Z-direction position of the vehicle body side target site BT (S3b) is also measured; in the fifth Step S16, the Z-direction position of the module side target site MT (S16b) is detected; and in the sixth Step S24, the vertical position of the module M is corrected, so that the module side target site MT is aligned with the vehicle body side target site BT.

Thus, the above-described attachment method can further improve the centering accuracy in the Y and Z directions. Further, the above-described attachment method can eliminate the locating pin (reference numeral 1 in FIG. 2) attached to the vehicle body B due to the above-mentioned improvement in centering accuracy, thereby reducing man-hours and manufacturing costs.

Note that the module attachment method is not limited to the embodiments described above in terms of configuration, but can be modified as needed without departing from the scope of the invention, and, in addition to the cockpit modules described in each embodiment, can be applied to the attachment of various modules and various components, such as front end modules, rear door modules, headlamps, rear combination lamps, hoods, etc.

The invention claimed is:
1. A module attachment method for attaching a module held by an industrial robot to a vehicle body stopped at a prescribed position,
   the vehicle body and the module having vehicle body side joints and module side joints, respectively, facing each other in an X direction on left and right sides of the vehicle body and the module, with a front-rear direction of the vehicle body as the X direction, a left-right direction as a Y direction and an up-down direction as a Z direction, the module attachment method comprising:
   a first step of measuring positions of left and right vehicle body side joints in the X, Y and Z directions and angles with respect to the X, Y and Z axes relative to the vehicle body and detecting a vehicle body side error that is a difference between a measured value and a reference position of the vehicle body;
   a second step of measuring positions of the left and right module side joints in the X, Y and Z directions and angles with respect to the X, Y and Z axes relative to the module held by the industrial robot and detecting a module side error that is a difference between a measured value and a reference position of the module;
   a third step of moving the module into the vehicle body, so that the vehicle body side joints and the module side joints are facing each other while the position of the module in the X, Y and Z directions and the angles with respect to the X, Y and Z axes are corrected based on the vehicle body side error and the module side error;
   a fourth step of detecting a vehicle body center in the Y direction of the vehicle body by measuring positions of left and right sides of the vehicle body in the Y direction using the vehicle body side error after the third step;

a fifth step of detecting the module center in the Y direction of the module by measuring the positions of the left and right sides of the module in the Y direction using the vehicle body side error after the third step; and a sixth step of correcting a position of the module so that the module center detected in the fifth step coincides with the vehicle body center detected in the fourth step.

2. The module attachment method according to claim 1, further comprising arranging a non-contact type fixed-side distance measurement sensor at a fixed site facing the module held by the industrial robot;

arranging second and third industrial robots on both the right and left sides of the vehicle body;

arranging a non-contact movable-side distance sensor on each hand of the second and third industrial robots for measuring the module side joints in the second step by the fixed-side distance sensor; and using the movable-side distance sensors of the second and third industrial robots to measure the vehicle body side joints in the first step, to measure both right and left sides of the vehicle body in the fourth step, and to measure both the right and left sides of the module in the fifth step.

3. The module attachment method according to claim 2, wherein each of the movable side distance sensors and the fixed side distance sensor comprises a two-dimensional image sensor and a distance sensor.

4. The module attachment method according to claim 1, further comprising using a contact sensor that comes in contact with at least one of the left and right vehicle body side joints of the vehicle body from the X direction;

detecting the position of the vehicle body side joints in the X direction using the contact sensor before centering the module on the vehicle body; and detecting the position of the module side joints of the module moved into the vehicle body in the X direction using the contact sensor.

5. The module attachment method according to according to claim 1, further comprising setting a vehicle body side target site and a module side target site that are aligned at a time of attachment on the left and right sides of the vehicle body and the module, respectively;

detecting the vehicle body center in the Y direction of the vehicle body and measuring the vehicle body side target site in the Z direction in the fourth step, detecting the module center in the Y direction of the module and detecting the module side target site in the Z direction in the fifth step, and correcting the left and right sides of the module so that the module center coincides with the vehicle body center and top and bottom positions of the module are corrected so that the module side target site and the vehicle body side target site are aligned in the sixth step.

* * * * *